(No Model.) 2 Sheets—Sheet 2.

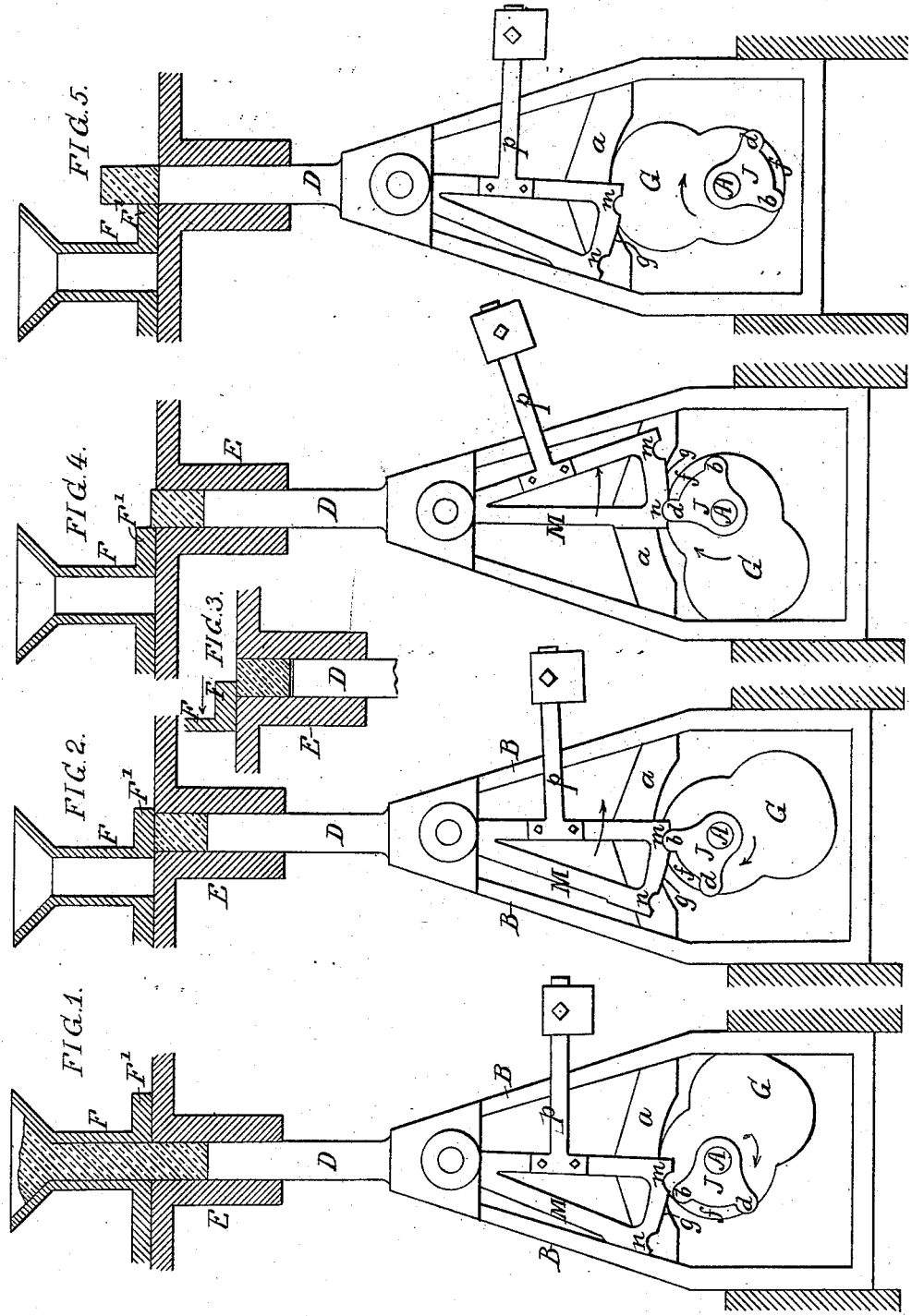

J. P. BIRCH.
MECHANICAL MOVEMENT.

No. 273,015. Patented Feb. 27, 1883.

WITNESSES:
James F. Tobin
Harry Drury

INVENTOR:
John P. Birch
by his Attorneys
Howson & Sons

UNITED STATES PATENT OFFICE.

JOHN P. BIRCH, OF PHILADELPHIA, PENNSYLVANIA.

MECHANICAL MOVEMENT.

SPECIFICATION forming part of Letters Patent No. 273,015, dated February 27, 1883.

Application filed January 15, 1883. (No model.)

*To all whom it may concern:*

Be it known that I, JOHN P. BIRCH, a citizen of the United States, and a resident of Philadelphia, Pennsylvania, have invented a new Mechanical Movement, of which the following is a specification.

My invention consists of a mechanical movement for transforming a continuous rotary motion into a differential reciprocating motion, the device being intended mainly for presses for plastic material.

Figure 7:
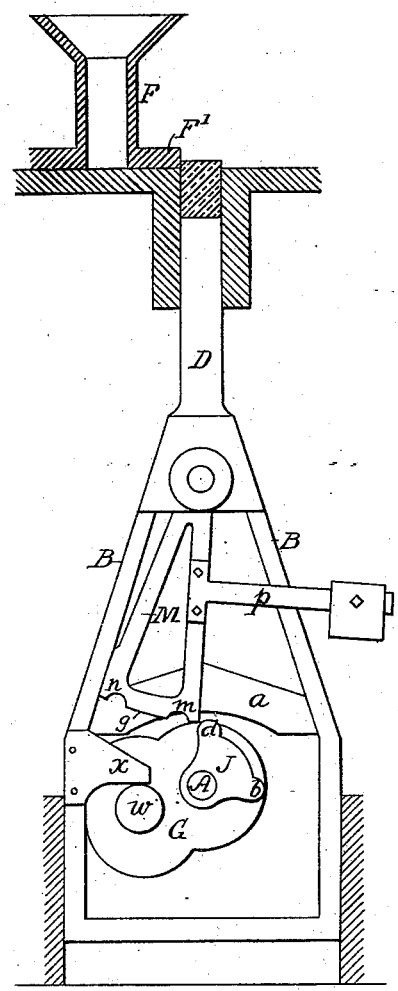
Figure 6:
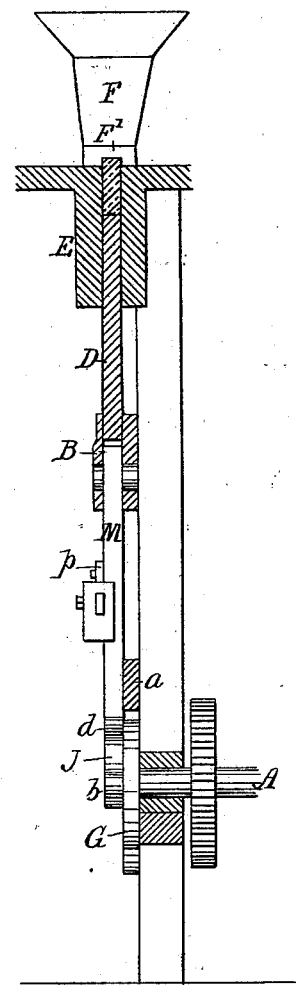

In the accompanying drawings, Figures 1, 2, 3, 4, and 5, Sheet 1, are diagrams illustrating the operation of my mechanical movement in its simplest form, and used in connection with a press for molding blocks of plastic material; Fig. 6, Sheet 2, a transverse section of the device with the parts in the position shown in Fig. 7, and Fig. 7 a front view illustrating another form of my invention.

A is the main shaft; B, a guided frame secured to or forming part of the plunger D; E, the mold, and F a sliding hopper having a flange, F', forming a mold-cover.

On the shaft A are two cams, G and J, the former acting on a transverse bar, $a$, of the frame B, and the cam J acting on the lower end of an arm, M, the upper end of which is pivoted to the frame B at a point in line vertically with the center of the plunger D and the center of the shaft A. The acting face of the cam J comprises the opposite lugs $b$ $d$ and the intervening surface, $f$, and the lower end of the arm M has formed in it opposite recesses $m$ and $n$, between which is the surface $g$, the lug $d$ being somewhat farther from the center of the shaft A than the lug $b$, for a purpose set forth hereinafter.

The operation of the device is as follows: While the mold E is being filled the arm M occupies the inclined position shown in Fig. 1, and the cam J has not yet commenced to act upon the same. As soon, however, as the mold has been filled and the hopper retracted, so that its flange F' covers the mold, the lug $b$ of the cam J engages with the recess $m$ of the arm M, and as the cam continues to turn, the arm swings in the direction of the arrow, the arm and cam thus forming toggle mechanism, whereby the upward movement of the frame B is effected, and the plunger D caused to impart powerful pressure to the mass of plastic material in the mold E, as shown in Fig. 2. As the movement of the cam continues, the arm M continues to swing in the direction of the arrow, the surfaces $f$ and $g$ working in contact with each other, until the lug $d$ finally engages with the recess $n$ of the arm, when there will be a further elevation of the frame B and plunger D, owing to the fact that said lug $d$ is farther from the center of the shaft A than the lug $b$. This effects a slight movement of the molded block in the mold, as shown in Fig. 4, so as to overcome the adhesion of the plastic material to the sides of the mold, and thus facilitate the ejection of the molded block, which is effected by the action of the cam G on the transverse bar $a$ of the frame B, as shown in Fig. 5.

The surfaces $f$ and $g$ are preferably so formed that there will be a slight drop of the plunger, as shown in Fig. 3, after the block is compressed and before the lug $d$ commences to act on the arm M, the object being to relieve the molded block from pressure while the hopper is being retracted, so that the friction of the block against the under side of the flange F' will not be such as to retard the movement of the hopper. The arm M has a laterally-projecting weighted arm, $p$, which serves to restore the arm to its normal position, Fig. 1, as soon as said arm is free from the control of the lug $d$. A spring may be used in place of this arm, if desired.

Instead of locating the lug $d$ farther from the center of the shaft A than the lug $b$, both lugs may be equidistant from the center, and the desired result may be attained by making the recess $n$ less in depth than the recess $m$; or in some cases the lug $d$ and recess $n$ may be dispensed with altogether, and the ejection of the molded block effected entirely by the action of the cam G. The use of the lug $d$ is preferred, however, as by this means a powerful effort is exerted in order to free the block from contact with the sides of the mold, and the work of the cam G is thereby lessened. In some cases I provide the cam G with a projecting pin carrying a roller or block, $w$, Fig. 6, adapted to act upon a lug, $x$, on the frame B, so that both the block and the cam act to effect the elevation of said frame; and, if desired, a crank-pin carrying a roller or block adapted to act upon a suitable bearing on the frame may be used in place of the cam G, instead of merely in addition thereto, as shown.

I claim as my invention—

1. A mechanical movement in which a guided frame, B, having a laterally-swinging arm, M, pivoted thereto, is combined with a driving-shaft, A, having a cam or equivalent device for acting on the frame, and a cam, J, for acting on the swinging arm, as set forth.

2. The combination of the guided frame B, the arm M, pivoted thereto and having recesses $m$ and $n$, and the shaft A, having a cam or equivalent device for acting on the frame, and a cam, J, adapted to act on the arm M, and having two lugs, $b$ $d$, as set forth.

3. The combination of the shaft A, with its cams G and J, the guided frame B, and the counterweighted arm M, pivoted to said frame, as set forth.

4. The combination of the frame B, the arm M, pivoted thereto, the shaft A, the cam J, adapted to act on the arm M, and the cam G, with roller or block $w$, adapted to act on the frame, as set forth.

5. The combination of the guided frame B, having a laterally-swinging arm, M, pivoted thereto, with the cam J, adapted to act upon said arm, the surface $f$ of the cam and the surface $g$ of the arm being constructed as set forth, whereby there is a slight drop of the frame B after the first elevation of the same, as specified.

In testimony whereof I have signed my name to this specification in the presence of two subscribing witnesses.

JOHN P. BIRCH.

Witnesses:
THOMAS DUGAN,
HARRY SMITH.